US011995674B2

(12) United States Patent
Sun et al.

(10) Patent No.: US 11,995,674 B2
(45) Date of Patent: *May 28, 2024

(54) SOCIAL MEDIA GRAPHICAL INTERFACE SYSTEM

(71) Applicant: Capital One Services, LLC, McLean, VA (US)

(72) Inventors: Bor J Sun, San Francisco, CA (US); Mark Mendez, Richmond, VA (US); Jonathan R. Turfboer, Richmond, VA (US); Philip Kedy, Midlothian, VA (US); George H. Williams, Midlothian, VA (US); Matthew S. Butterworth, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/851,376

(22) Filed: Jun. 28, 2022

(65) Prior Publication Data

US 2022/0327571 A1   Oct. 13, 2022

Related U.S. Application Data

(63) Continuation of application No. 15/944,440, filed on Apr. 3, 2018, now Pat. No. 11,403,657, which is a continuation of application No. 14/097,914, filed on Dec. 5, 2013, now abandoned.

(60) Provisional application No. 61/734,047, filed on Dec. 6, 2012.

(51) Int. Cl.
G06Q 30/02        (2023.01)
G06Q 30/0214      (2023.01)
G06Q 50/00        (2012.01)

(52) U.S. Cl.
CPC ......... *G06Q 30/0214* (2013.01); *G06Q 30/02* (2013.01); *G06Q 50/01* (2013.01)

(58) Field of Classification Search
None
See application file for complete search history.

(56) References Cited

U.S. PATENT DOCUMENTS

| 2007/0121843 A1 | 5/2007 | Atazky et al. |
| 2009/0030774 A1 | 1/2009 | Rothschild et al. |
| 2009/0248517 A1 | 10/2009 | Tran et al. |
| 2011/0264528 A1 | 10/2011 | Whale |
| 2011/0320250 A1 | 12/2011 | Gemmell et al. |
| 2012/0022944 A1 | 1/2012 | Volpi |
| 2012/0030586 A1 | 2/2012 | Ketkar |

(Continued)

FOREIGN PATENT DOCUMENTS

| CA | 2732057 A1 | 8/2011 |
| WO | WO-2012037109 A2 | 3/2012 |

*Primary Examiner* — Vincent M Cao
(74) *Attorney, Agent, or Firm* — Perkins Coie LLP (57) ABSTRACT

Systems and methods are disclosed for providing social media referrals based rewards to a customer. The systems and methods may provide incentives to customers of financial-service providers ("FSP") based on their referrals to the FSP. Customer referrals may be determined for the customer by gathering data regarding referrals received from messages distributed by the customer via social media. Based on the referrals, an amount of rewards may be provided for business transactions initiated by the customer.

20 Claims, 5 Drawing Sheets

(56) References Cited

U.S. PATENT DOCUMENTS

| | | |
|---|---|---|
| 2012/0101881 A1 | 4/2012 | Taylor et al. |
| 2012/0215604 A1 | 8/2012 | Canetto |
| 2012/0253918 A1 | 10/2012 | Marois et al. |
| 2012/0259693 A1* | 10/2012 | Dao ................... G06Q 30/0227 |
| | | 705/14.27 |
| 2012/0271691 A1 | 10/2012 | Hammad et al. |
| 2012/0278164 A1 | 11/2012 | Spivack et al. |
| 2012/0290654 A1 | 11/2012 | Detwiller et al. |
| 2013/0018893 A1 | 1/2013 | Nelson et al. |
| 2013/0179284 A1 | 7/2013 | Stager |
| 2013/0275179 A1 | 10/2013 | Marshall |
| 2013/0339084 A1 | 12/2013 | Kahn |

* cited by examiner

SOCIAL MEDIA GRAPHICAL INTERFACE SYSTEM

Cross Reference to Related Applications

This is a continuation of U.S. application Ser. No. 15/944,440, filed Apr. 3, 2018, currently pending, which is a continuation of U.S. application Ser. No. 14/097,914, filed Dec. 5, 2013, which claims priority under 35 U.S.C. § 119 to U.S. provisional application No. 61/734,047, filed Dec. 6, 2012, all of which are incorporated herein by reference in their entireties.

TECHNICAL FIELD

The disclosed embodiments generally relate to customer rewards offered by financial-service providers and, more particularly, to processes and systems for providing incentives to customers for their referrals.

BACKGROUND

Many financial-service providers, such as banks and credit-card companies, offer customer rewards for using their services, such as making purchases or balance transfers, obtaining loans, making direct deposits, or paying bills through the financial-service provider. Customer rewards are offered in various forms, such as cash, points, discounts, and miles for airline travel.

Meanwhile, social networks have become popular in recent years. More people join every day and connect with peers to share information and ideas via social media. Businesses have begun using social networks as advertising platforms. For example, social networks enable businesses to advertise promotions, encourage social network users to mention products and brands, and maintain social-network profiles to share ideas. Some customers who use social networks exert a significant influence on social media, and their influence causes other social-network users to try brands or products discussed or promoted by the customer.

Thus, some companies may seek provide incentives to customers for referring new customers to the company via social networks.

SUMMARY

The present disclosure offers, among other things, a way for customers to benefit from their social-media influence and referrals, which in turn may provide increased community awareness of the financial-service provider and generates new customers for financial-service providers.

Disclosed embodiments include systems and processes that provide a customer with rewards from a financial-service provider. Rewards may be awarded for customer-initiated business transactions, such as purchases of goods and services. Rewards may also be awarded for customer referrals involving social media, such as social networks. Customer rewards may also increase as a result of the customer's influence within social networks. The disclosed embodiments include mechanisms that assist in gathering information about business transactions and referrals by the customer. Disclosed embodiments also include mechanisms for determining rewards the customer is eligible to receive because of gathered data.

Consistent with a disclosed embodiment, a method for providing rewards to customers based on social-media referrals is provided. The method may include tracking business transactions initiated by a customer and determining, by one or more processors, a reward corresponding to the business transactions. The method may also include receiving referral data related to the customer. The method may further include determining, by the one or more processors, a referral-reward modifier for the customer, and modifying the reward based on the referral-reward modifier.

Consistent with another disclosed embodiment, a system for providing rewards to customers based on social-media referrals is provided. The system may include one or more memory devices having instructions stored thereon and one or more processors that execute the instructions to track business transactions initiated by a customer and determine a reward corresponding to the business transactions. The one or more processors may also execute the instructions to receive referral data related to the customer. The one or more processors may further execute the instructions to determine a referral-reward modifier for the customer, and modify the reward based on the referral-reward modifier.

Consistent with other disclosed embodiments, tangible computer-readable storage media may store program instructions that are executable by one or more processors to implement any of the processes disclosed herein.

Both the foregoing general description and the following detailed description are exemplary and explanatory only. They do not restrict the disclosed embodiments.

BRIEF DESCRIPTION OF THE DRAWINGS

The accompanying drawings, which constitute a part of this specification, illustrate several embodiments and, together with the description, serve to explain the disclosed principles. In the drawings.

The flowchart in FIG. 2 shows an exemplary social-media referral-reward process, consistent with the disclosed embodiments.

The flowchart in FIG. 3 shows an exemplary rewards for social-media referral and social-media influence process, consistent with the disclosed embodiments.

DETAILED DESCRIPTION

Reference will now be made in detail to exemplary embodiments, examples of which are illustrated in the accompanying drawings and are disclosed herein. Wherever convenient, the same reference numbers will be used throughout the drawings to refer to the same or like parts.

Figure 1:
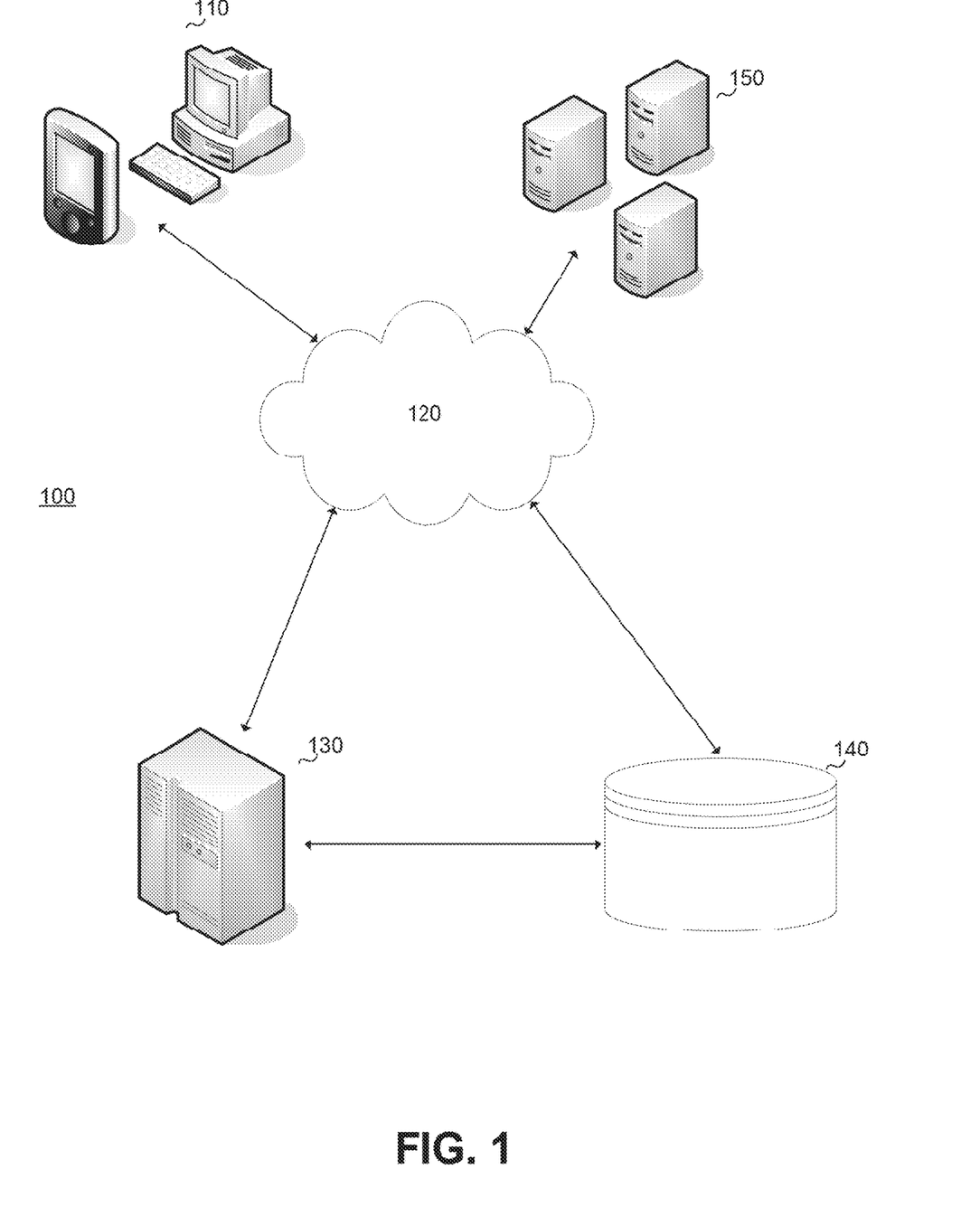
FIG. 1 is diagram of an example system that may be used to implement the disclosed embodiments.

FIG. 1 shows an example of a system configured to perform one or more functions consistent with embodiments of the present disclosure. The system components and arrangement shown in FIG. 1 are not intended to be limiting to the disclosed embodiment because the components used to implement the processes and features disclosed herein may vary.

In accordance with certain disclosed embodiments, a system 100 may be provided that includes one or more user devices 110, a network 120, at least one server 130, at least one database 140, and one or more social-network servers 150. Other components known to one of ordinary skill in the art may be included in system 100 to process, transmit, provide, and receive information consistent with the disclosed embodiments.

Customer device(s) 110 may be one or more computer systems. For example, customer device 110 may include a general-purpose or notebook computer, a mobile device, a server, a desktop computer, a tablet, or any combination of these computers and/or affiliated components. In one embodiment, customer device 110 may be a computer system or device that is operated by a user who is a customer or a potential customer of a financial-service provider. Customer device 110 may be configured with storage such as a computer-readable storage medium that stores one or more operating systems that perform known operating-system functions when executed by one or more processors. By way of example, the operating systems may include Microsoft Windows™, Unix™, Linux™, Apple™ operating systems, Personal Digital Assistant (PDA) type operating systems, such as Microsoft CE™, or other types of operating systems. Accordingly, disclosed embodiments operate and function with computer systems running any type of operating system. Customer device 110 storage may also include a program that, when executed by a processor, provides communications with network 120, such as Web browser software, networking software, etc.

Server 130 may be a computer-based system configured as a single server or a distributed computer system, including multiple servers or computers that interoperate to perform one or more of the processes and functionalities associated with the disclosed embodiments. Server 130 may include computer-system components, such as one or more servers, desktop computers, workstations, tablets, hand-held computing devices, memory devices, and/or internal network(s) connecting the components.

Server 130 may be configured with one or more processor(s) (not shown), that may be one or more known central-processing units, such as a microprocessor from the Pentium™ family manufactured by Intel™ or the Turion™ family manufactured by AMD™. Processor(s) may include a single-core or multiple-core processor system that provides the ability to perform parallel processes simultaneously. For example, a processor may be a single-core processor that is configured with virtual processing technologies known to those skilled in the art. In certain embodiments, processor(s) may use logical processors to simultaneously execute and control multiple processes. Processor(s) may implement virtual machine technologies, or other similar known technologies to provide the ability to execute, control, run, manipulate, store, etc. multiple software processes, applications, programs, etc. In another embodiment, processor(s) may include a multiple-core processor arrangement (e.g., dual or quad core) that is configured to provide parallel processing functionalities to allow server 130 to execute multiple processes simultaneously. One of ordinary skill in the art would understand that other types of processor arrangements could be implemented that provide for the capabilities disclosed herein.

Server 130 may include one or more storage devices configured to store information used by processors (or other components) to perform one or more processes consistent with the functionalities disclosed herein. In one example, server 130 may include a memory (not shown) that includes instructions to enable processor(s) to execute one or more applications, such as server applications, network-communication processes, and any other type of application or software known to be available on computer systems. Alternatively, the instructions, application programs, etc. may be stored in an external storage or available from a memory over a network. The one or more storage devices may be a volatile or nonvolatile, magnetic, semiconductor, tape, optical, removable, nonremovable, or other type of storage device or tangible computer-readable medium.

Server 130 may also be communicatively connected to one or more databases 140 locally or through a network. Database 140 may be configured to store information and may be accessed and/or managed by server 130. By way of example, database 140 may be a document-management system, Microsoft SQL database, SharePoint database, Oracle™ database, Sybase™ database, or other relational database. Systems and methods of disclosed embodiments, however, are not limited to separate databases or even to the use of a database.

Server 130 may include one or more I/O devices (not shown) that may comprise one or more interfaces for receiving signals or input from input devices and providing signals or output to one or more output devices that allow data to be received and/or transmitted by server 130. For example, server 130 may include interfaces to one or more input devices, such as one or more keyboards, mouse devices, and the like, that enable server 130 to receive data from one or more system administrators. Furthermore, I/O devices may include components configured to send and receive information between server 130, database 140, components in communication with network 120, or components external to network 120.

Network 120 may be any type of wired or wireless network that provides communications, exchanges information, and/or facilitates the exchange of information between customer device 110, server 130, database 140, and social-network servers 150. In one embodiment, network 120 may be the Internet, a Local Area Network, or other suitable connection(s) that enables bidirectional communication between system 100 components.

Figure 2:
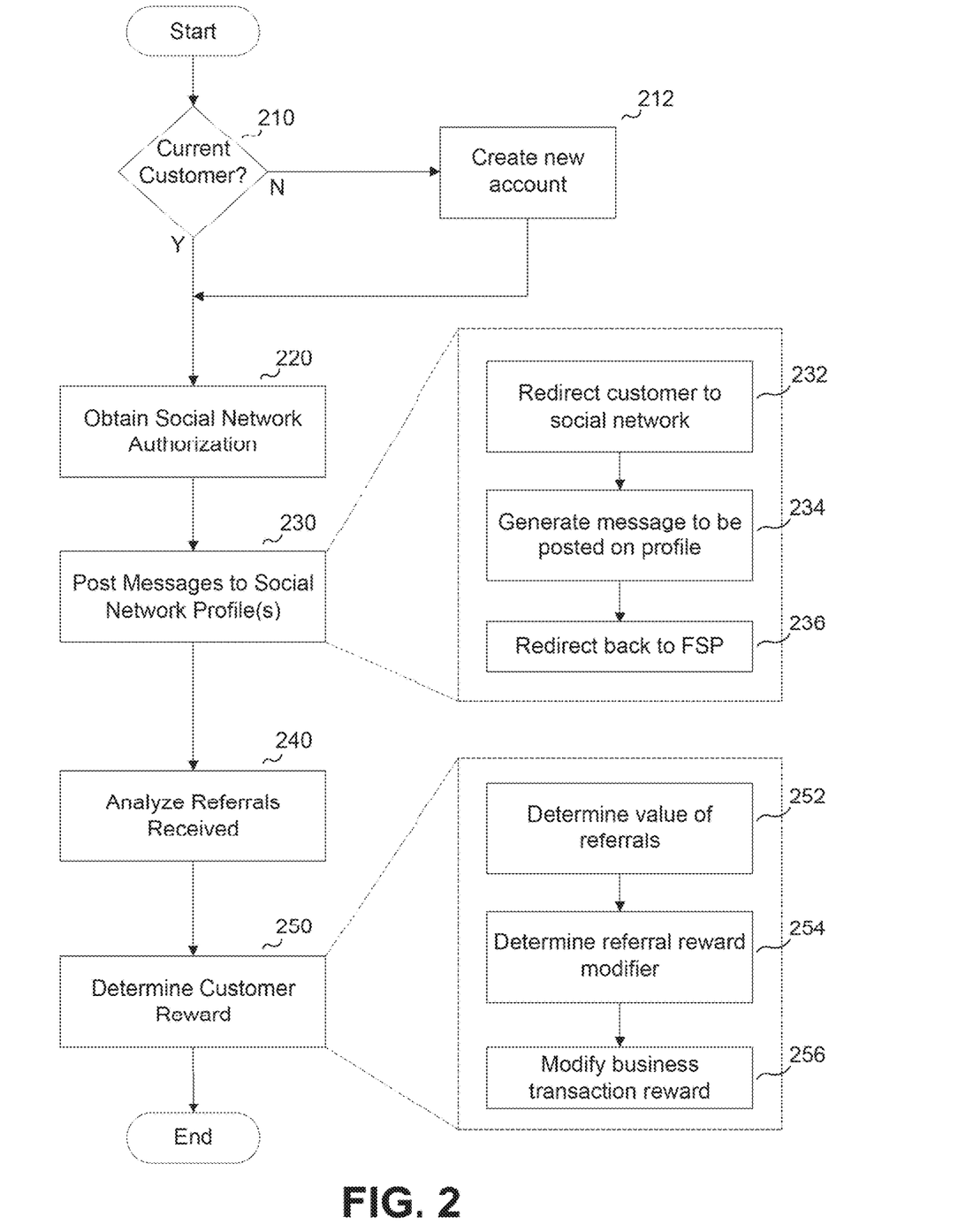

FIG. 2 shows a flowchart of an exemplary process for awarding rewards for social-media influence. Rewards may be provided by a financial-service provider ("FSP"), such as, for example, a bank, lender, merchant, credit-card provider, and any other entity that provides financial accounts to customers. Financial accounts may include, for example, credit-card accounts, checking accounts, savings accounts, loyalty rewards accounts, loans, investment accounts, and any other type of account relating to financial products.

The FSP may provide a reward to customers directly proportional to the business transactions initiated by the customer, and between the FSP and a third party. Rewards earned may include points, airline miles, an amount of money, etc. to be credited to the customer's account, or transferred to the customer. Business transactions may include credit- or debit-card purchases, balance transfers, account deposits or withdrawals, e-checks, bill payments, ATM transactions, direct deposits, transfers between FSP accounts, loan payments, issuance of new loans, bond or stock transactions, or any other business transactions provided by the FSP. These rewards may be referred to herein as "business-transaction rewards." Embodiments of the present disclosure include processes for awarding rewards for social-media influence that supplement or modify the business-transaction rewards.

The process begins when an individual visits a website or launches an application provided by the financial-service provider ("FSP"), to establish a connection with server 130.

The FSP may verify whether the individual is a current customer in step 210. For example, the FSP may prompt the customer to enter information such as date of birth, zip code, and/or last four digits of the customer's rewards card. If the individual is not a current customer, the individual may be prompted to create a new account in step 212 and become a customer. The customer may then log into the account (not shown).

Once logged in, server 130 may obtain authorization to access the customer's social networks in step 220. To obtain authorization (not shown in detail in FIG. 2), the customer may be redirected to a website maintained by social-network server 150 for the selected social network. Social-network server 150 may ask the customer to identify themselves such as by entering their name, contact information, account number, a pin, password, date of birth, or username. Social-network server 150 may then request the customer's permission to allow the FSP to post messages to the customer's social-network profile. After the customer chooses whether to grant permission, the customer may be redirected back to the FSP website. In certain embodiments, redirecting the customer may be accomplished by changing the website displayed on customer device 110, or by displaying a pop-up window to request permission to access social-network data. Once redirected back to the FSP website, the customer may choose to link another social network, at which point the customer is redirected again to social-network server 150 operated by the second social network, to request permission to access social-network data. Step 220 may be repeated until the customer has linked all of the social networks desired for calculating their level of social-media influence.

After authorization has been obtained from desired social networks, messages may be posted to social-network profiles in step 230. To post a message, the customer may select a button corresponding to the desired social network (not shown). In step 232, the customer may be redirected to the selected social network. In some embodiments, the customer may be redirected to another FSP website or application page in step 232, rather than redirected to a website maintained by social-network servers 150. Server 130 may generate a preset message to post on the customer's social-network profile in step 234. The preset message may be provided in the appropriate format for the selected social network. For example, a preset message to be posted to Twitter may be limited to 140 characters. The preset message may include a link unique to the customer, information specific to the customer such as a social-media influence level determined for the customer, or rewards the customer has received from the FSP. The unique link may redirect other social-network users to a website or application provided by the FSP, to sign up as a new FSP customer and/or register for a rewards program. The unique link may also cause server 130 to receive indications such as number of referrals generated by the customer and new customers who signed up via the customer's unique link. Furthermore, active links included in messages may be shortened by third-party URL shortening services, such as shortURL or TinyURL. After the message has been posted to the customer's social-network profile, the customer may be redirected back to the FSP in step 236.

Referring again to step 230, the customer may select another social network to post more messages and thus increase the potential number of referrals and maximize the reward. Steps 230, 232, 234, and 236 may be repeated until the customer has posted messages to all desired social networks.

In step 240, server 130 may analyze referral data received. Step 240 may include qualitative or quantitative scoring of referrals. This referral data includes, for example, the number of new customers who signed up as new FSP customers via the customer's posted message links, the number of social-network users who clicked the message links but did not sign up, amount of positive feedback for the posted messages, and comments left by other social-network users regarding the customer's posted messages.

In step 250, a customer reward may be determined. To determine a customer reward, the value of received referral data may be determined in step 252. Value may be determined by weighting and scoring different types of referral data. For example, a new FSP customer referral may be weighted highly, and assigned a high score. Web traffic through the customer's message links may be assigned a lower weighting, and given a lower score. Comments or feedback left for the customer's posted messages may be assigned yet a lower weighting. Rules for weighting and scoring may be preset by the FSP. A total score for the referral data may be obtained.

In step 254, a referral-reward modifier may be determined based on the scored referral data. The referral-reward modifier includes, for example, a numerical score, or a qualitative influence level having a corresponding number or number range. For example, three received referrals may correspond to three hundred reward points. In some embodiments, a referral-reward modifier may correspond to a multiplier proportional to the number of referrals. For example, three referrals may correspond to a multiplier of 3×. All minimum and maximum values for referral-reward modifiers, and rules for correlating referrals to points and/or multipliers may be preset by the FSP, and stored by server 130 in database 140.

In step 256, a customer reward may be determined by modifying a business-transaction reward by the referral-reward modifier. As previously discussed, the business-transaction reward may be provided for business transactions initiated by the customer, and between the FSP and a third party, and may include points, airline miles, or an amount of money to be credited to the customer's account, or transferred to the customer.

To determine the business-transaction reward, server 130 monitors the customer's business transactions (not shown in figure). Monitoring may involve tracking business transactions performed over a predetermined period of time, or obtaining a history of business transactions for the customer from database 140. The business-transaction reward for the monitored business transactions may then be determined, and the amount of the business-transaction reward may be directly proportional to the dollar amount of the business transaction. For example, if the customer initiates business transactions between the FSP and a third party valued at one hundred dollars during the monitoring period, the business-transaction reward may be one hundred points, or one hundred miles. In other embodiments, the proportion of rewards to transaction amount may be higher, such as providing two hundred points for one hundred dollars worth of business transactions.

Referring still to step 256, the business-transaction reward may be modified by the referral-reward modifier to calculate a customer reward. In some embodiments, the referral-reward modifier may correspond to a rewards adjustment, which may be, for example, the rewards multiplier described above or an amount of rewards to be added to the customer reward. For example, modification may include adding an amount of rewards corresponding to the referral-reward modifier, or multiplying the referral-reward modifier by the business-transaction reward. For example, if the business-transaction reward is one hundred points, and the referral-reward modifier corresponds to a multiplier of 3×, the customer reward is 300 points. If for example, the referral-reward modifier corresponds to an added 300 points, the customer reward is 400 points. After step 256, the customer reward may be communicated to the customer by displaying a customer-reward value on customer device 110 (not shown). In some embodiments, server 130 may transmit a notification (e.g., send an e-mail, SMS message, etc.) to customer device 110 to provide the customer with a summary of their referral results.

Figure 3:
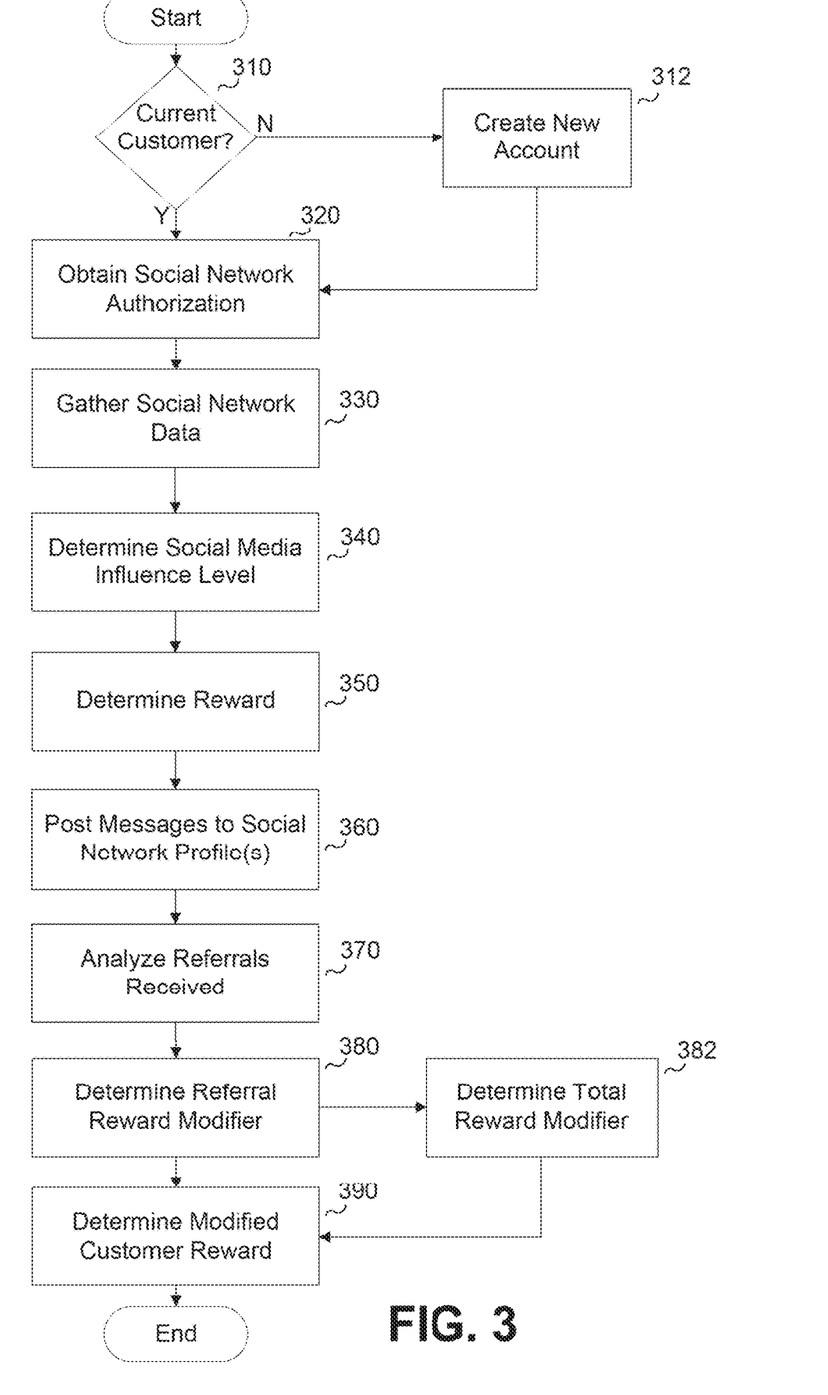

The flowchart in FIG. 3 shows an example of a referral-reward process with additional rewards provided for various levels of social-media influence, consistent with the disclosed embodiments. It is to be understood that some steps in FIG. 3 may be performed similar to corresponding steps discussed in regard to FIG. 2. The process begins when an individual visits a website or launches an application provided by the financial-service provider ("FSP"), to establish a connection with server 130. The FSP verifies whether the individual is a current customer in step 310. If the individual is not a current customer, the individual is prompted to create a new account in step 312 and become a customer. The customer then logs into the account (not shown).

Once logged in, server 130 may obtain authorization to access data from the customer's linked social networks in step 320. After social-media networks have been linked and authorization has been obtained, server 130 may gather social-network data from social-network server(s) 150 in step 330. Server 130 may then analyze all gathered social-network data, to determine the customer's level of social-media influence in step 340. The level of social-media influence may correspond to an amount of supplemental rewards to be added to a business-transaction reward, or a multiplier used to multiply a business-transaction reward. Details regarding determination of levels of social-media influence are provided in U.S. Provisional Application No. 61/734,052, filed on Dec. 6, 2012, for "Social Media Influence Based Rewards", the entirety of which is incorporated herein by reference.

In step 350, a customer reward may be determined by modifying a business-transaction reward by the level of social-media influence. For example, if a business-transaction reward is one hundred points, and the level of social-media influence corresponds to a multiplier of 2×, the customer reward is two hundred points. The customer reward and/or the level of social-media influence may be displayed to the customer on customer device 110 (not shown). The customer may then decide to post one or more messages on one or more of their social-network profiles in step 360, to increase their potential reward amount. Messages may include active links or information to refer other social-network users to the FSP, in order to attract new FSP customers.

In step 370, server 130 may analyze referral data received. Step 370 may include qualitative or quantitative scoring of referrals. This referral data includes, for example, the number of new customers who signed up as new FSP customers via the customer's posted message links, the number of social-network users who clicked the message links but did not sign up, amount of positive feedback for the posted messages, and comments left by other social-network users regarding the customer's posted messages.

Based on the analysis, a referral-reward modifier may be determined in step 380. The referral-reward modifier includes, for example, a numerical score, or a qualitative influence level having a corresponding number or number range. For example, three received referrals may correspond to three hundred reward points. In some embodiments, a referral-reward modifier may correspond to a multiplier proportional to the number of referrals. In other embodiments, the reward modifier may be a supplemental amount of points, airline miles, or money to be credited to the customer's account, or money to be transferred to the customer.

In step 382, a total-reward modifier may be calculated. The total-reward modifier may be determined by combining the level of social-media influence and the referral-reward modifier. For example, if the level of social-media influence corresponds to a multiplier of 3×, and the referral-reward modifier corresponds to a multiplier of 2×, the total-reward modifier is 5×. In another example, if the level of social-media influence corresponds to a supplemental 100 points, and the referral-reward modifier corresponds to a supplemental 200 points, the total-reward modifier is 300 points. In some embodiments, the total-reward modifier may be determined by multiplying the level of social-media influence by the referral-reward modifier. For example, in such embodiments, when the level of social-media influence corresponds to a multiplier of 3×, and the referral-reward modifier corresponds to a multiplier of 2×, the total-reward modifier is 6×. Furthermore, if the level of social-media influence corresponds to a supplemental 100 points, and the referral-reward modifier corresponds to a multiplier of 2×, the total-reward modifier is 200 points. The FSP may set rules for calculating total-reward modifier, which may be observed by server 130. Rules may include minimum and maximum possible total-reward modifiers, or rounding rules for rounding the total-reward modifier up or down. For example, the total-reward modifier may be limited to a maximum multiplier of 10×. In this example, if the level of social-media influence corresponds to a multiplier of 5×, and the referral-reward modifier corresponds to a multiplier of 3×, the calculated total-reward modifier of 15× is reduced to a maximum multiplier of 10×. The determined total-reward modifier may be communicated to the customer by displaying the information on customer device 110 (not shown).

In step 390, a modified customer reward may be determined. Determining the modified customer reward may include adding the referral-reward modifier to the customer reward previously determined in step 350, or multiplying the customer reward by the referral-reward modifier. For example, if the business-transaction reward was previously calculated to be 100 points, and the level of social-media influence corresponded to a multiplier of 2×, the customer reward was 200 points. Then, if the referral-reward modifier corresponds to a multiplier of 2×, the modified customer reward is 400 points.

In alternative embodiments, the modified customer reward may be determined by modifying the business-transaction reward by the total-reward modifier, which would yield the same result. For example, the level of social-media influence corresponded to a multiplier of 2× and the referral-reward modifier corresponded to a multiplier of 2×, the total-reward modifier is a multiplier of 4×. The modified customer reward would still be 400 points (4× multiplied by the business-transaction reward of 100 points). The resulting modified customer reward may be communicated to the customer (not shown) by displaying the information on customer device 110 (not shown).

Figure 4:
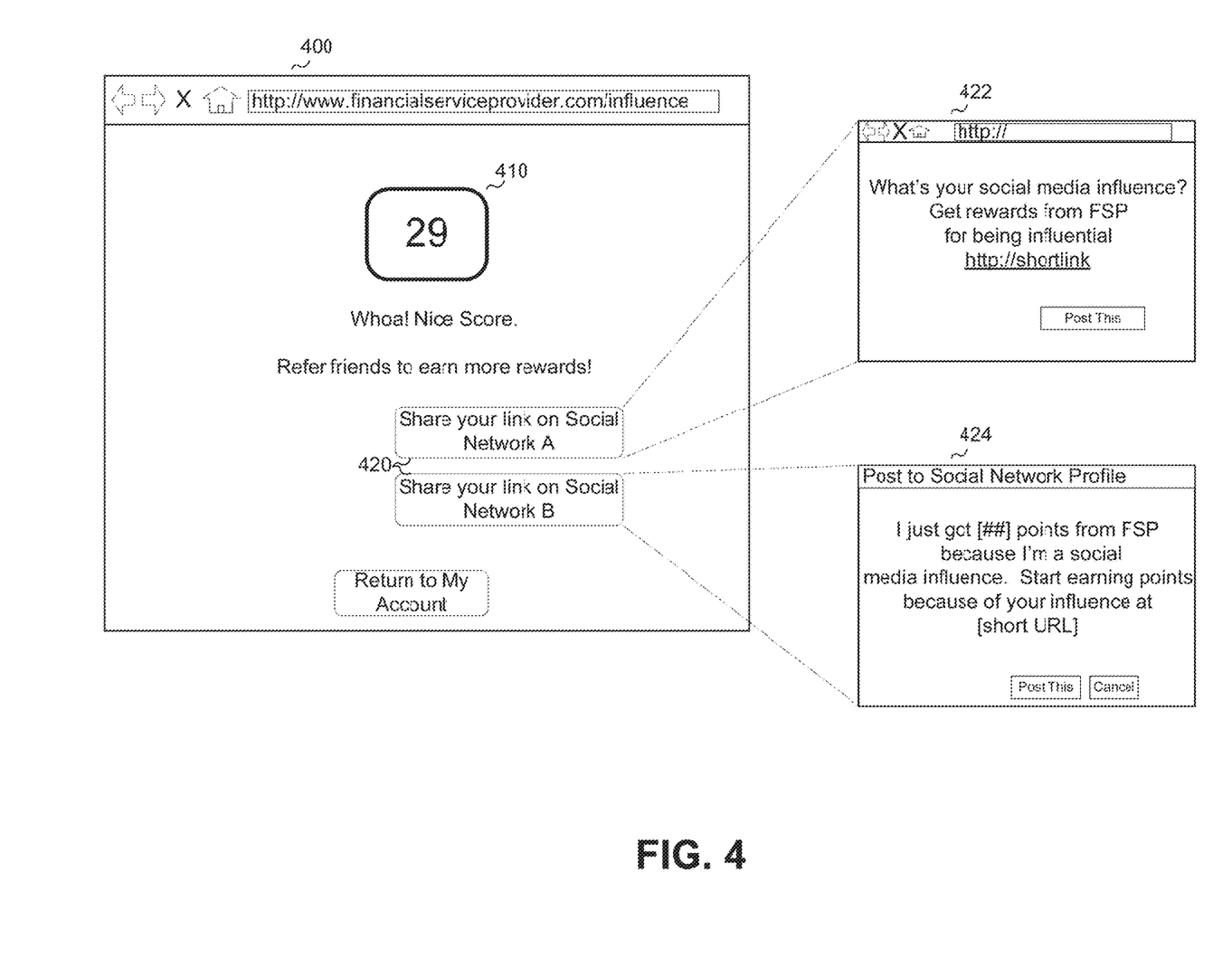
FIG. 4 provides an example of a user interface for viewing information about the level of social-media influence and for posting messages to social networks, consistent with the disclosed embodiments.

FIG. 4 shows an example of a customer-influence interface 400 that may be generated to inform a customer of their calculated level of social-media influence and to provide options for increasing their reward amounts. The customer's level of social-media influence may be displayed in box 410. The interface may prompt the customer to decide whether they would like to earn additional rewards by posting messages on their linked social-media networks. If the customer so chooses, they may select one or more of share buttons 420. Based on the selection of one of social-network buttons 420 for Social Network A, the interface may redirect the customer to Social Network A post page 422. A predetermined message may be displayed in Social Network A post page 422. The message may be generated by server 130 and previously set by the FSP. The message may include text inviting other social-network users to become FSP customers and/or receive rewards. Additionally, the message may include active links to redirect other social-network users to sign up as new FSP customers, register to receive rewards for current customers, and/or download an application provided by the FSP. To reduce the length of the message, the active links may be shortened and provided by a short URL or link shortening service. In some embodiments, the customer may edit the message before posting.

Returning again to customer-influence interface 500, selection of one of share buttons 420 for Social Network B may redirect the customer to Social Network B post page 424. A predetermined message may be displayed in Social Network B post page 424. The message may be generated by server 130 and previously set by the FSP. In some embodiments, the customer's level of social-media influence may be included in the message. Additional share buttons 420 may allow the customer to post messages to additional social-network profiles. Furthermore, one of share buttons 420 may allow the customer to send an email generated by server 130 to chosen recipients.

The preset messages generated by server 130 may vary depending on which social-network profile is receiving the posted message. For example, a message to be posted on a Facebook profile may not have any particular restrictions on length or content, whereas a message to be posted on Twitter may be limited to 140 characters. A message to be sent by email may also include preset text for the email subject. To automatically select the proper message format, server 130 may be informed of which social network the message is to be posted on when the customer selects one of share buttons 420.

Figure 5:
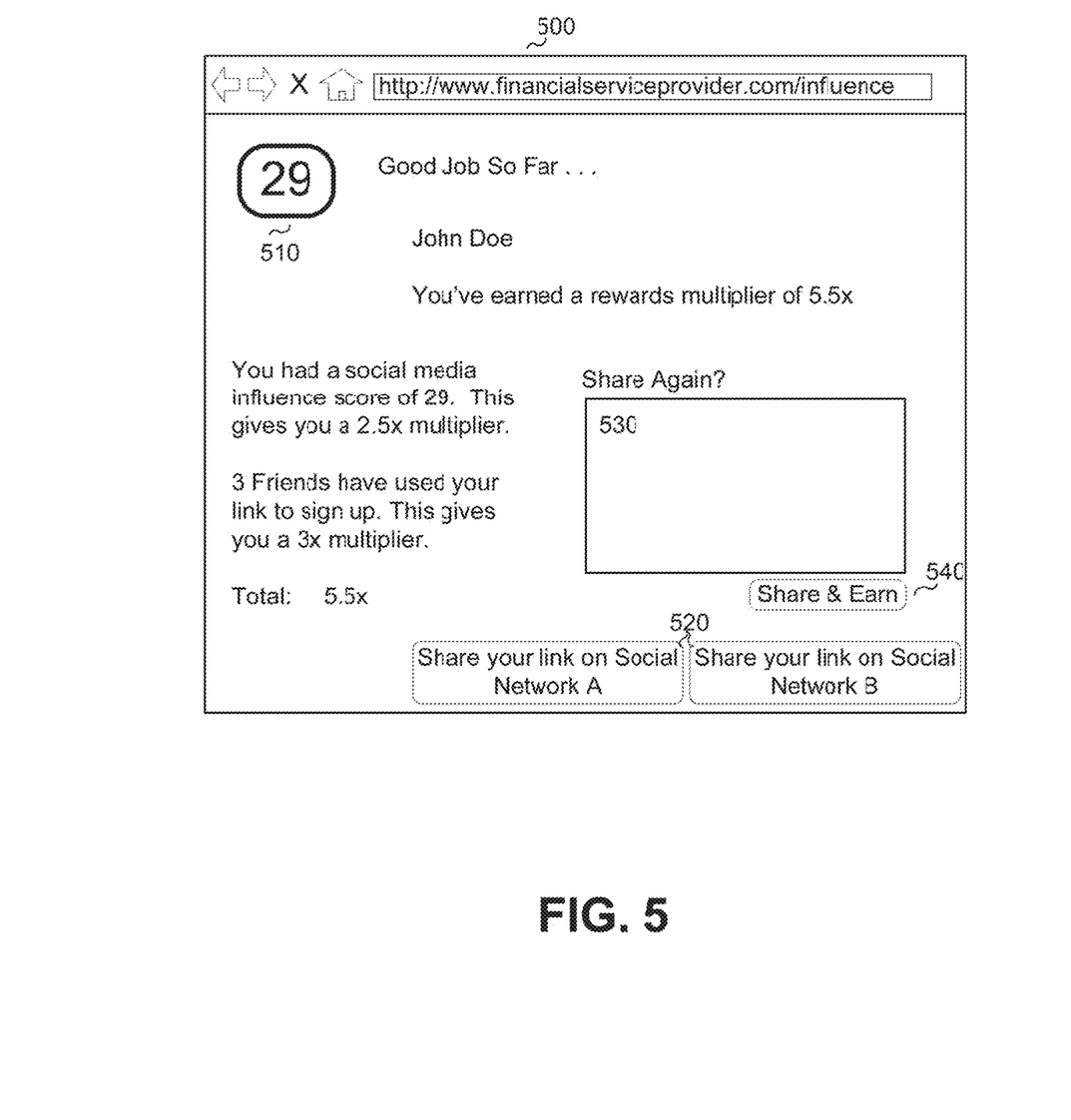
FIG. 5 provides an example user interface for viewing information about the level of social-media influence and referrals, for viewing earned rewards, and for posting additional messages to social networks, consistent with the disclosed embodiments.

FIG. 5 shows an example of a reward-information interface 500 that may be generated by server 130 to provide current customer reward information and options to a customer via customer device 110. Reward-information interface 500 may display the level of social-media influence in box 510. Additional text may inform the customer of their total-reward modifier. In the example illustrated by FIG. 5, customer John Doe has a total-reward modifier of 5.5×. His level of social-media influence is 29 (on a scale of 1 to 100), which corresponds to a multiplier of 2.5×. The 2.5× multiplier is obtained by correlating the level of social-media influence to a multiplier of 2.9× (where the multiplier may be calculated on a scale of 1 to 10), and rounding down to the nearest multiple of 0.5×. John Doe's referral-reward modifier is 3×, which corresponds to three referrals received via unique links in his social-network messages. The multipliers from the level of social-media influence and the referral-reward modifier are added to produce a total of 5.5×. The customer may choose to share their referral link by posting messages on their social-network profiles via selection of share link buttons 520. Depending on whether the customer had already posted a message (via selection of share buttons 420 in FIG. 4), selection of share link buttons 520 may cause a second or subsequent message to be posted to the customer's social-network profile. Selection of one of share link buttons 520 may cause server 130 to provide a preset message, formatted for the particular social network selected, to be displayed in share box 530. The customer may edit the message in share box 530 before posting to their social-network profile via post button 540.

Data used or calculated during one or more of the exemplary processes disclosed herein, such as data related to business transactions, a business-transaction reward, a customer reward, an incentive-reward modifier, a modified customer reward, a referral-modifier reward, a level of social-media influence, and referral data, may be stored in database 140, in customer device 110 memory, at an external remote data storage location, or distributed among storage locations.

Furthermore, methods, systems, and articles of manufacture consistent with disclosed embodiments are not limited to separate programs or computers configured to perform dedicated tasks. For example, system 100 components may include a memory that may include one or more programs to perform one or more functions of the multiple-user and display-control features of the disclosed embodiments. Moreover, processor(s) may execute one or more programs located remotely from system 100. For example, system 100 may access one or more remote programs, that, when executed, perform functions related to disclosed embodiments. Memory may include one or more memory devices that store data and instructions used to perform one or more features of the disclosed embodiments. Memory may also include any combination of one or more databases controlled by memory-controller devices (e.g., server(s), etc.) or software, such as document-management systems, Microsoft SQL databases, SharePoint databases, Oracle™ databases, Sybase™ databases, or other relational databases.

Additionally, although disclosed aspects of the present disclosure such as software programs are described as being stored in a memory on a computer, one skilled in the art will appreciate that these aspects can also be stored on other types of computer-readable media, such as secondary-storage devices, like hard disks, floppy disks, a CD-ROM, or other forms of RAM or ROM. An implementation of software for disclosed aspects may use any variety of programming languages, such as Java, C, C++, JavaScript, or any other now known or later-created programming language.

Other embodiments will be apparent to those skilled in the art from consideration of the specification and practice of the embodiments disclosed herein. It is intended that the specification and examples be considered as exemplary only, with the true scope and spirit being indicated by the following claims.

In addition, the disclosed embodiments may not be limited to any particular type of account or device. That is, instead of financial accounts, aspects of the disclosed embodiments may be implemented to provide rewards for any type of account (e.g., financial, memberships, utilities, phone services, etc.).

What is claimed is:

1. A graphical user interface system comprising:
   at least one processor; and
   at least one non-transitory memory storing instructions that, when executed by the at least one processor, cause the system to perform operations comprising:
      generating, by a service provider server, and providing to a user, a registration interface in response to a registration request, the registration interface including an authentication control for authenticating the user and an authorization control for redirecting the user to an authorization page of a social media network;

generating, by the service provider server, and providing to the user, an influence interface including:

a share control for redirecting the user to a post page of the social media network, the post page preconfigured with a first preset message, the first preset message being formatted for the social media network based on information provided to the service provider server indicating a selection of the social media network, the first preset message including a unique referral link associated with the user;

determining, by the service provider server, a referral-reward modifier for the user based on referral data associated with the unique referral link, wherein the referral-reward modifier comprises a numerical score;

determining, by the service provider server, a business-transaction reward, the business-transaction reward comprising a value associated with a monitored business transaction of the user;

calculating, by the service provider server, a customer reward based on the business-transaction reward and the referral-reward modifier; and generating, by the service provider server, and providing to the user, a rewards interface including an indicator that displays the customer reward.

2. The system of claim 1, wherein determining the business-transaction reward comprises tracking a plurality of business transactions initiated by the user over a period of time.

3. The system of claim 2, wherein tracking the plurality of business transactions further comprises obtaining a history of business transactions of the user from a database.

4. The system of claim 1, wherein the business-transaction reward is directly proportional to a business transaction initiated by the user.

5. The system of claim 1, wherein the business-transaction reward comprises one of airline miles, points, or a credit to an account associated with the user.

6. The system of claim 1, wherein the monitored business transaction comprises a credit card purchase, a debit card purchase, a balance transfer, an account deposit, an account withdrawal, a bill payment, an ATM transaction, a loan payment, or a stock transaction.

7. The system of claim 1, wherein calculating the customer reward comprises multiplying the business-transaction reward by the referral-reward modifier.

8. The system of claim 1, wherein calculating the customer reward comprises adding the business-transaction reward to the referral-reward modifier.

9. The system of claim 1, wherein the referral data comprises a number of social-network users that interacted with a social network posting by the user in the social media network.

10. The system of claim 1, wherein the unique referral link points to a registration webpage, and the referral data comprises a number of accesses of the registration webpage using the unique referral link.

11. A method for providing a graphical user interface, comprising:

generating, by a service provider server, and providing to a user, a registration interface in response to a registration request, the registration interface including an authentication control for authenticating the user and an authorization control for redirecting the user to an authorization page of a social media network;

generating, by the service provider server, and providing to the user, an influence interface including:

a share control for redirecting the user to a post page of the social media network, the post page preconfigured with a first preset message, the first preset message being formatted for the social media network based on information provided to the service provider server indicating a selection of the social media network, the first preset message including a unique referral link associated with the user;

determining, by the service provider server, a referral-reward modifier for the user based on referral data associated with the unique referral link, wherein the referral-reward modifier comprises a numerical score;

determining, by the service provider server, a business-transaction reward, the business-transaction reward comprising a value associated with a monitored business transaction of the user;

calculating, by the service provider server, a customer reward based on the business-transaction reward and the referral-reward modifier; and generating, by the service provider server, and providing to the user, a rewards interface including an indicator that displays the customer reward.

12. The method of claim 11, wherein the referral-reward modifier corresponds to a multiplier proportional to a number of referrals from the unique referral link.

13. The method of claim 11, wherein the rewards interface further comprises an indicator that displays a number of referrals received from the unique referral link.

14. The method of claim 11, wherein the rewards interface further comprises an indicator that provides options for increasing the customer reward.

15. One or more non-transitory computer-readable media storing instructions that, when executed by one or more processors, cause operations comprising:

generating, and providing to a user, a registration interface in response to a registration request, the registration interface including an authentication control for authenticating the user and an authorization control for redirecting the user to an authorization page of a social media network;

generating, and providing to the user, an influence interface including a share control for redirecting the user to a post page of the social media network, the post page preconfigured with a first preset message, the first preset message being formatted for the social media network based on information provided to a service provider server indicating a selection of the social media network, the first preset message including a unique referral link associated with the user;

calculating a customer reward based on referral data associated with the unique referral link; and generating, and providing to the user, a rewards interface including an indicator that displays the customer reward.

16. The one or more non-transitory computer-readable media of claim 15, wherein calculating the customer reward comprises providing a score for one or more of a new customer referral, an interaction with the unique referral link, or a comment on the user's first preset message on the social media network.

17. The one or more non-transitory computer-readable media of claim 15, wherein calculating the customer reward comprises multiplying a business-transaction reward by a referral-reward modifier.

18. The one or more non-transitory computer-readable media of claim 15, wherein calculating the customer reward comprises adding a business-transaction reward to a referral-reward modifier.

19. The one or more non-transitory computer-readable media of claim 15, wherein the referral data comprises a number of social-network users that interacted with a social network posting by the user in the social media network.

20. The one or more non-transitory computer-readable media of claim 15, wherein:
   the unique referral link points to a registration webpage; and
   the referral data concerns a number of accesses of the registration webpage using the unique referral link.

* * * * *